(12) United States Patent
Huang

(10) Patent No.: US 10,466,352 B2
(45) Date of Patent: Nov. 5, 2019

(54) VEHICULAR RADAR SYSTEM

(71) Applicant: Wistron NeWeb Corporation, Hsinchu (TW)

(72) Inventor: Guo-Shu Huang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 333 days.

(21) Appl. No.: 15/350,119

(22) Filed: Nov. 14, 2016

(65) Prior Publication Data

US 2017/0363734 A1  Dec. 21, 2017

(30) Foreign Application Priority Data

Jun. 15, 2016  (TW) .............................. 105118683 A

(51) Int. Cl.
*G01S 13/93* (2006.01)
*G01S 13/87* (2006.01)

(52) U.S. Cl.
CPC .......... *G01S 13/931* (2013.01); *G01S 13/878* (2013.01); *G01S 2013/9378* (2013.01)

(58) Field of Classification Search
CPC ................... G01S 13/931; G01S 13/34; G01S 2013/0254; G01S 7/032; G01S 2013/0245; G01S 13/4463; G01S 7/282; G01S 7/285; G01S 13/42; G01S 13/4454; G01S 13/584; G01S 13/726; G01S 13/60; H01Q 1/3233; H01Q 3/2605; H01Q 3/34; H01Q 21/245; H01Q 21/064; H01Q 3/22; H01Q 21/00; H01Q 21/061; H01Q 25/02; H01Q 3/36; H01Q 13/0233; H01Q 25/00; H01Q 25/004; H01Q 3/00
See application file for complete search history.

(56) References Cited

U.S. PATENT DOCUMENTS

| | | | | |
|---|---|---|---|---|
| 7,786,928 B2* | 8/2010 | Hansen | ................... | G01S 7/032 342/11 |
| 8,462,047 B1* | 6/2013 | Ai | ........................ | H04B 7/0617 342/372 |
| 8,593,337 B2* | 11/2013 | Ookawa | ................... | H01Q 3/36 342/165 |
| 8,731,483 B2* | 5/2014 | Holter | .................. | H01Q 21/061 455/78 |
| 9,360,549 B1* | 6/2016 | Liu | ........................ | H01Q 3/267 |
| 9,673,882 B2* | 6/2017 | Ai | ........................ | H04B 7/0617 |
| 2008/0117961 A1* | 5/2008 | Han | ....................... | H04B 7/043 375/227 |

(Continued)

*Primary Examiner* — Olumide Ajibade Akonai
(74) *Attorney, Agent, or Firm* — Winston Hsu

(57) ABSTRACT

A vehicular radar system includes a plurality of transmitting sub-arrays and a transmission power divider. The plurality of transmitting sub-arrays are symmetric with respect to a symmetry axis, and the plurality of transmitting sub-arrays are parallel to the symmetry axis. The transmission power divider, coupled to the plurality of transmitting sub-arrays, is configured to apply a plurality of phases and a plurality of amplitudes to the plurality of transmitting sub-arrays. A first transmitting sub-array, among the plurality of transmitting sub-arrays and closest to the symmetry axis, and a second transmitting sub-array, among the plurality of transmitting sub-arrays and farthest away from the symmetry axis, have a phase difference in between, and the phase difference is between 120 degrees and 180 degrees.

19 Claims, 7 Drawing Sheets

(56) References Cited

U.S. PATENT DOCUMENTS

| | | | |
|---|---|---|---|
| 2013/0027240 A1* | 1/2013 | Chowdhury | G01S 7/032 |
| | | | 342/94 |
| 2014/0203960 A1* | 7/2014 | Huang | G01S 7/034 |
| | | | 342/175 |
| 2016/0033640 A1* | 2/2016 | De Mersseman | G01S 7/2813 |
| | | | 342/70 |
| 2017/0363713 A1* | 12/2017 | Kim | G01S 7/024 |
| 2019/0020122 A1* | 1/2019 | Hester | H01Q 9/0407 |

* cited by examiner

VEHICULAR RADAR SYSTEM

BACKGROUND OF THE INVENTION

1. Field of the Invention

The present invention relates to a vehicular radar system, and more particularly, to a vehicular radar system capable of sensing traffic condition from a rear and a side of a vehicle at the same time.

2. Description of the Prior Art

As traffic safety is more important, vehicular safety equipment is getting more various. In addition to active or passive safety systems (such as anti-lock braking system, electronic brake-force distribution system, traction control system, electronic stability system, supplementary restraint system, etc.), vehicular warning systems attract more attention. The vehicular warning systems utilize a radar system to sense traffic conditions from a rear or a side of the vehicle, and send out a warning light signal or an alarm sound to a driver in advance. The driver may change a driving direction according to the alarm signals to avoid a traffic accident due to the driver's carelessness or a blind spot of vision.

Common vehicular warning system may be a lane change assistance (LCA) system, a door open warning (DOW) system, a rear cross traffic alert (RCTA) system and a blind spot detection (BSD) system. The LCA system and the DOW system are configured to sense traffic conditions behind the vehicle, and the RCTA system and the BSD system focus on traffic conditions on the side of the vehicle. However, the prior art lacks a radar system which achieves requirements of the LCA system, the DOW system, the RCTA system and the BSD system. That is, in the prior art, each side (either a left side or a right side) of the vehicle has to be equipped with more than one radar system. One radar system has a radiation pattern toward a rear of the vehicle, which is applied in the LCA system or the DOW system. The other radar system has a radiation pattern toward a side (either left side or right side) of the vehicle, which is applied in the ROTA system or the BSD system. In such a situation, more than one radar system should be disposed on one side of the vehicle. Hence, a production cost and an integration complexity of the vehicular warning system are raised.

Therefore, how to sense traffic condition from a rear and a side of a vehicle at the same time is a significant objective in the field.

SUMMARY OF THE INVENTION

It is therefore a primary objective of the present invention to provide a vehicular radar system capable of forming two main beams toward a rear and a side of a vehicle, to improve over disadvantages of the prior art.

An embodiment of the present invention discloses a vehicular radar system comprising a plurality of transmitting sub-arrays, wherein the plurality of transmitting sub-arrays are symmetric with respect to a symmetry axis and the plurality of transmitting sub-arrays are parallel to the symmetry axis; and a transmission power divider coupled to the plurality of transmitting sub-arrays, configured to apply a plurality of phases and a plurality of amplitudes to the plurality of transmitting sub-arrays; wherein a phase difference, between a first transmitting sub-array closest to the symmetry axis and a second transmitting sub-array farthest away from the symmetry axis, is between 120 degrees and 180 degrees.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
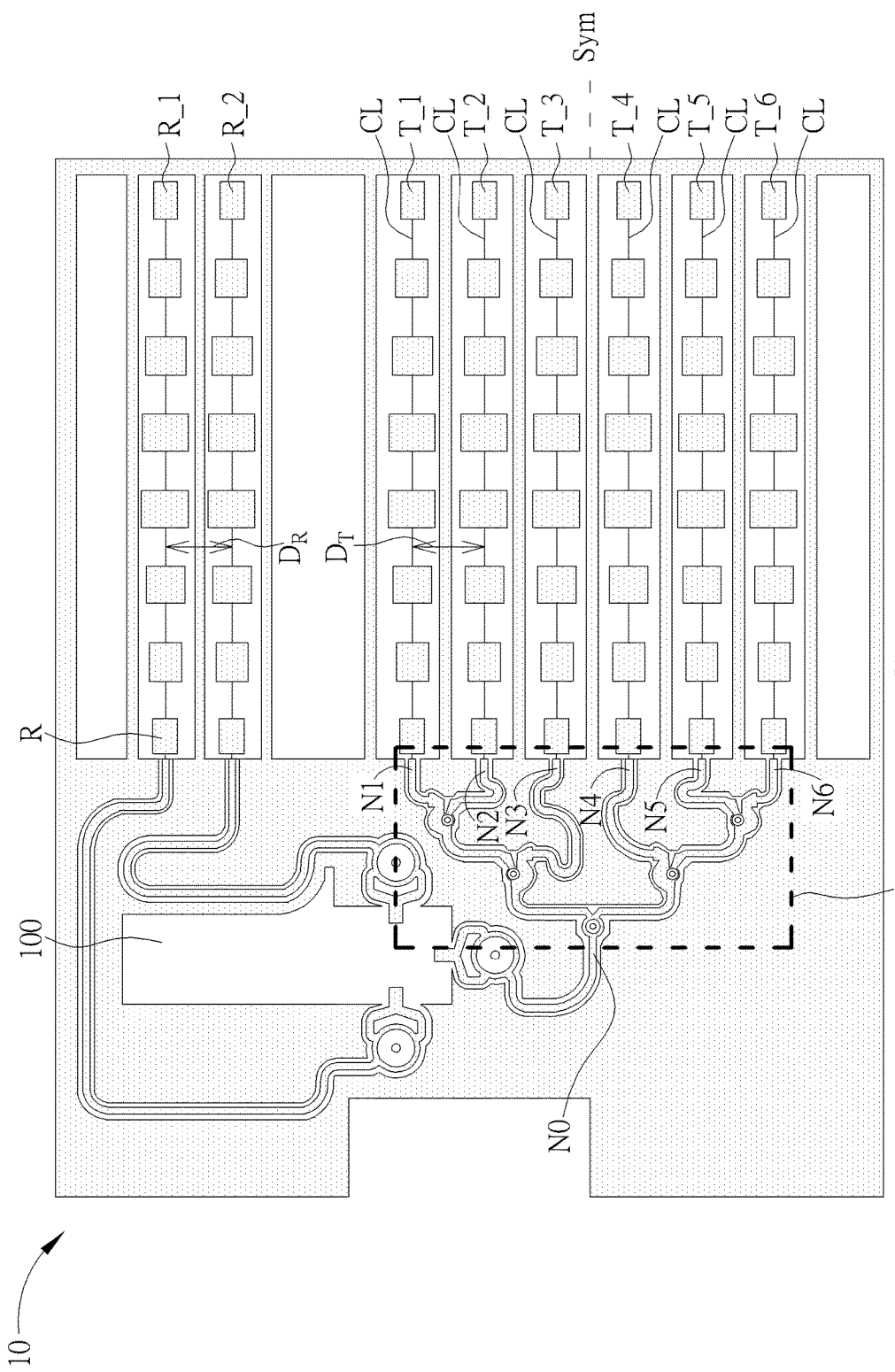
FIG. 1 is a schematic diagram of a vehicular radar system according to an embodiment of the present invention.
Figure 2:
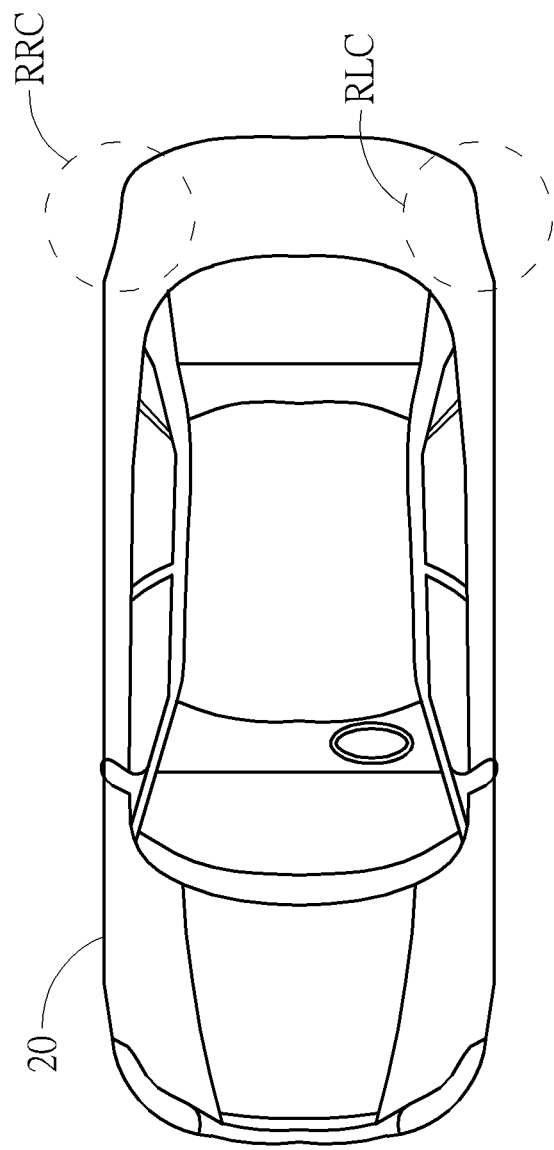
FIG. 2 is a schematic diagram of a car.

FIG. 1 is a schematic diagram of a vehicular radar system 10 according to an embodiment of the present invention. FIG. 2 is a schematic diagram of a car 20. The vehicular radar system 10 may be simultaneously applied to a lane change assistance (LCA) system, a door open warning (DOW) system, a rear cross traffic alert (ROTA) system and a blind spot detection (BSD) system. The vehicular radar system 10 may be disposed on one of the two rear corners/sides of a rear bumper of the car 20. As FIG. 2 shows, the vehicular radar system 10 may be disposed on a left-rear corner RLC or a right-rear corner RRC of the car 20. To achieve better warning performance, one may dispose two vehicular radar systems 10 on the two rear corners/sides of the car 20. That is, one vehicular radar system 10 may be disposed at the left-rear corner RLC of the car 20, and the other vehicular radar system 10 may be disposed at the right-rear corner RRC of the car 20. Each vehicular radar system 10 is able to form two main beams toward both a rear side and a left/right side of the car 20 so as to simultaneously achieve requirements of the LCA system, the DOW system, the RCTA system and the BSD system.

As FIG. 1 shows, the vehicular radar system 10 comprises a radio frequency (RF) processing module 100, a transmission power divider 102, transmitting sub-arrays T_1-T_6 and receiving sub-arrays R_1 and R_2 in accordance with an embodiment of the present invention. The RF processing module 100 may be a one-transmit-two-receive RF processing module. The transmission power divider 102 is coupled between the RF processing module 100 and the transmitting sub-arrays T_1-T_6. The transmission power divider 102 is configured to apply different phases and different amplitudes to the transmitting sub-arrays T_1-T_6 so as to form the two main beams. The transmitting sub-arrays T_1-T_6 is configured to transmit a radar signal (e.g., a millimeter wave), and the receiving sub-arrays R_1 and R_2 are configured to receive a reflected signal corresponding to the radar signal and deliver the reflected signal to the RF processing module 100. The RF processing module 100 may detect incoming vehicles from the rear side and/or the left/right side of the car 20. The transmitting sub-arrays T_1-T_6 are equally separated. The transmitting sub-arrays T_1-T_6 and the receiving sub-arrays R_1-R_2 may have a same antenna structure. Specifically, each sub-array of the transmitting sub-arrays T_1-T_6 and the receiving sub-arrays R_1, R_2 comprises a plurality of radiating elements R and a plurality of connecting lines CL, where the plurality of radiating elements R are connected via the connecting lines CL as a series. In addition, the vehicular radar system 10 has a symmetry axis Sym between the transmitting sub-array T_3 and the transmitting sub-array T_4. The connecting lines CL of the transmitting sub-arrays T_1-T_6 are parallel to the symmetry axis Sym, and the transmitting sub-arrays T_1-T_6 are symmetric with respect to the symmetry axis Sym. In other words, the transmitting sub-arrays T_1-T_3 are disposed on one side of the symmetry axis Sym, and the transmitting sub-arrays T_4-T_6 are disposed on the other side of the symmetry axis Sym. In addition, excitation positions of the transmitting sub-arrays T_1-T_6 are ends/terminals of the transmitting sub-arrays T_1-T_6, i.e., the transmitting sub-arrays T_1-T_6 are fed-in from/by nodes N1-N6.

In addition, the transmitting sub-arrays T_1-T_6 are equally separated by a transmission distance $D_T$, i.e., a transmitting sub-array T_k among the transmitting sub-arrays T_1-T_6 is separated from an adjacent transmitting sub-array T_k+1 (or T_k−1) by the transmission distance $D_T$. To have sufficient beamwidth of the main beams formed by the transmitting sub-arrays T_1-T_6, the transmission distance $D_T$ may be $\lambda/2$, i.e., one-half of a wavelength of a wireless signal of the vehicular radar system 10. In addition, the receiving sub-arrays R_1 and R_2 are also equally separated by a reception distance $D_R$. Since an angle scanning scope of the vehicular radar system increases as the reception distance $D_R$ decreases, the reception distance $D_R$ may be slightly smaller than $\lambda/2$, i.e., one-half of the wavelength of the wireless signal of the vehicular radar system 10, so as to widen an angle scanning scope of the vehicular radar system 10.

Furthermore, lengths of the radiating elements R and lengths of the connecting lines CL are all one-half of the wavelength of the wireless signal of the vehicular radar system 10. For each sub-array antenna, widths of the radiating elements are monotonically decreased from a center of the sub-array antenna to sides of the sub-array antenna. Thus, an intensity distribution of the sub-array antenna may be decreased from the center to sides, i.e., the intensity distribution of the sub-array antenna may be strongest in the center and monotonically decreased toward the both sides. Once the vehicular radar system 10 is vertically disposed on the rear bump of the car 20, radiation energies of the transmitting sub-arrays T_1-T_6 and the receiving sub-arrays R_1, R_2 may be concentrated in an Elevation plane, so as to enhance an antenna gain/sensing range and to suppress sidelobes thereof.

In addition, in order to form the two main beams, a phase difference, between a first transmitting sub-array closest to the symmetry axis and a second transmitting sub-array farthest away from the symmetry axis in the vehicular radar system, is 120-180 degrees. Take the vehicular radar system 10 as an example, the transmitting sub-array T_4 closest to the symmetry axis Sym and the transmitting sub-array T_6 farthest away from the symmetry axis Sym are required to have a phase difference between 120 degrees and 180 degrees, where the transmitting sub-array T_4 and the transmitting sub-array T_6 are disposed on the same side of the symmetry axis Sym. Therefore, the transmitting sub-arrays T_1-T_6 may form the two beams on an Azimuth plane.

Figure 3:
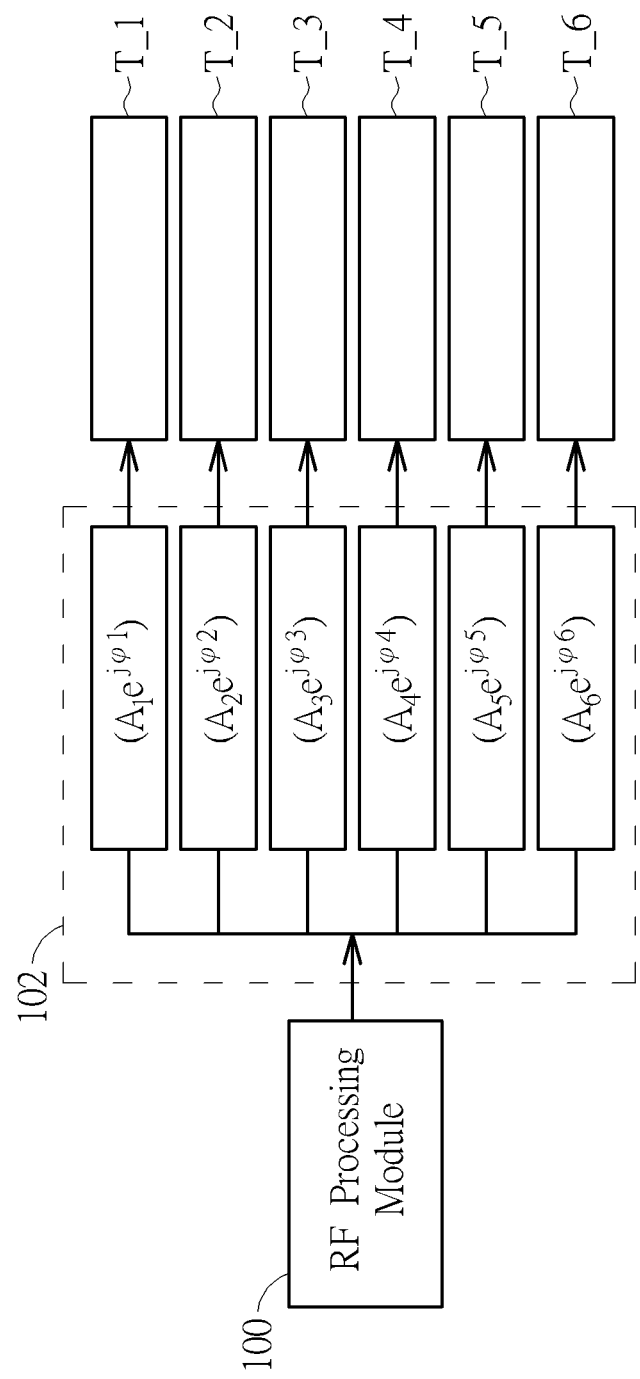
FIG. 3 is a schematic diagram of an equivalent circuit of a transmission power divider according to an embodiment of the present invention.

Means of forming the phase difference (between the first transmitting sub-array and the second transmitting sub-array) being 120-180 degrees are not limited. For example, the transmission power divider 102 may be properly designed, such that the transmitting sub-array T_4 and the transmitting sub-array T_6 have the phase difference therebetween, which is greater than 120 degrees and smaller than 180 degrees. Referring to FIG. 3, which is a schematic diagram of an equivalent circuit of the transmission power divider 102 according to an embodiment of the present invention. As shown in FIG. 3, the transmission power divider 102 applies amplitudes $A_1$-$A_5$ and phases $\varphi_1$-$\varphi_6$ to the transmitting sub-arrays T_1-T_6, respectively. The phases $\varphi_1$-$\varphi_6$ represent phase differences of the output nodes N1-N6 relative to an input node NO, respectively, of the transmission power divider 102. In other words, the phase $\varphi_m$ represents a phase difference of the output node Nm relative to the input node NO. The transmission power divider 102 may be properly designed, such that the phase $\varphi_4$ applied to the transmitting sub-array T_4 and the phase $\varphi_6$ applied to the transmitting sub-array T_6 have a phase difference $\Delta\varphi$, and the phase difference $\Delta\varphi$ is between 120 degrees and 180 degrees. In an embodiment, the phase $\varphi_4$ may be negative 30 degrees, and the phase $\varphi_6$ may be 150 degrees. Thus, the phase $\varphi_4$ and the phase $\varphi_6$ have a 180 degrees phase difference in between. The phases $\varphi_1$-$\varphi_3$ and $\varphi_5$ may be designed according to practical situation. For example, the phase $\varphi_1$ may be 180 degrees, the phase $\varphi_2$ may be 60 degrees, the phase $\varphi_3$ may be 90 degrees, and the phase $\varphi_5$ may be negative 30 degrees, which is not limited thereto.

In addition, the transmission power divider 102 may be properly designed, such that the transmitting sub-array(s) closest to the symmetry axis Sym have maximum amplitude(s), the transmitting sub-array(s) farthest away from the symmetry axis Sym have medium amplitude(s), and the rest of the transmitting sub-array(s) have minimum amplitude(s). For example, the transmission power divider 102 may be properly designed to achieve that the amplitudes $A_3$ and $A_4$ applied to the transmitting sub-arrays T_3 and T_4, which are closest to the symmetry axis Sym, are maximum, the amplitudes $A_1$ and $A_6$ applied to the transmitting sub-arrays T_1 and T_6, which are farthest from the symmetry axis Sym, are medium, and the amplitudes $A_2$ and $A_5$ applied to the transmitting sub-arrays T_2 and T_5 are minimum. Therefore, the two main beams formed by the vehicular radar system 10 are more obvious/significant. In an embodiment, the normalized amplitudes $A_3$ and $A_4$ (normalized to a maximum amplitude among the amplitudes $A_1$-$A_6$) are between 0.5 and 1, the normalized amplitudes $A_1$ and $A_6$ are between 0.2 and 0.5, and the normalized amplitudes $A_2$ and $A_5$ are between 0 and 0.2.

Figure 4:
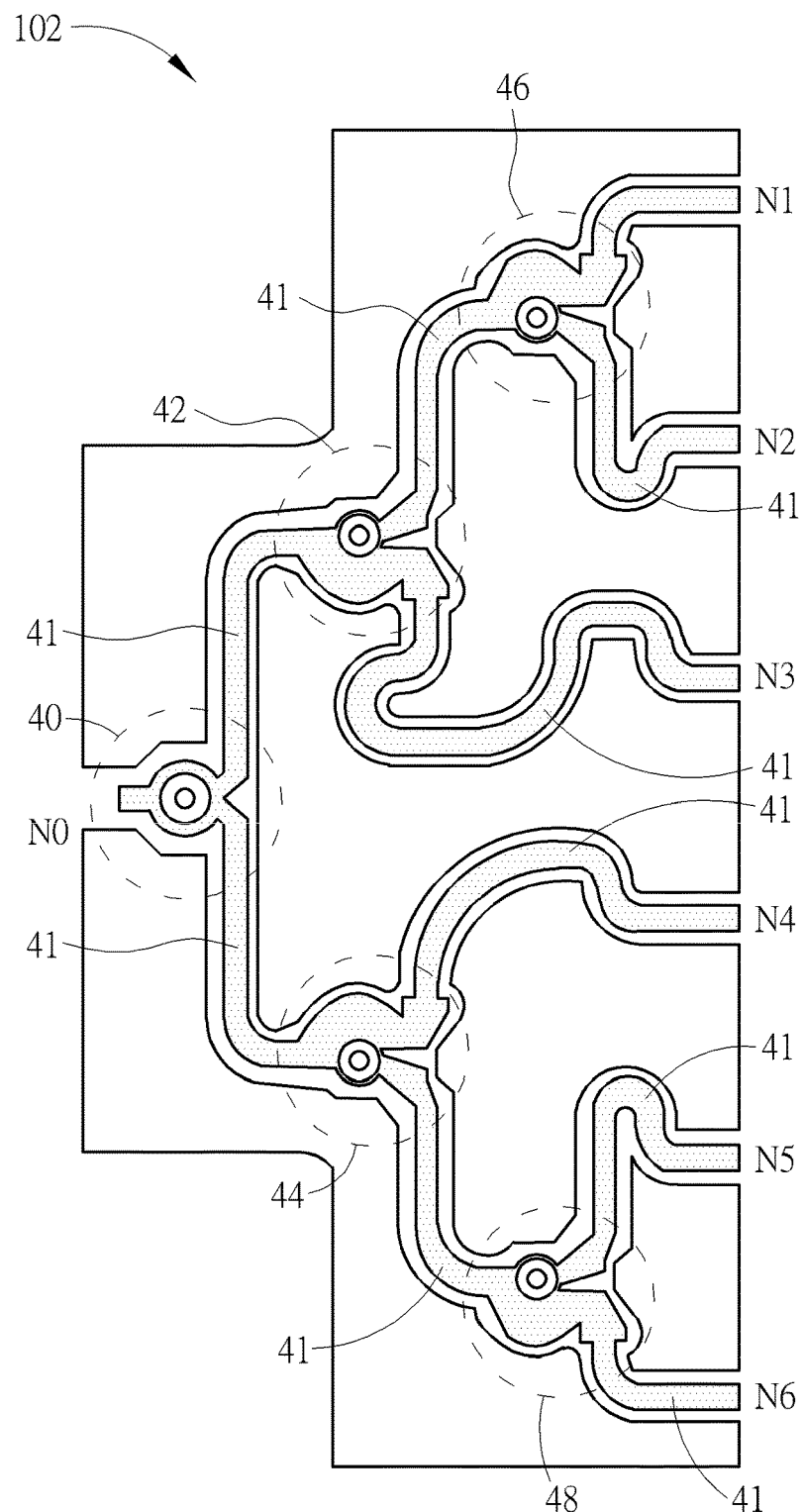
FIG. 4 is a schematic diagram of a transmission power divider according to an embodiment of the present invention.

Furthermore, FIG. 4 is a schematic diagram of the transmission power divider 102 according to an embodiment of the present invention. The transmission power divider 102 comprises transmission units 40, 42, 44, 46, 48 and a plurality of line segments 41. The transmission unit 40 may be an equal power dividing unit, and the transmission units 42, 44, 46 and 48 may be unequal power dividing units. The transmission units 40, 42, 44, 46 and 48 may be properly designed to choose the amplitudes $A_1$-$A_5$ applied to the transmitting sub-arrays T_1-T_6. The plurality of line segments 41 connects the input node NO, the transmission units 40, 42, 44, 46, 48 and the output nodes N1-N6. The phases φ₁-φ₆ are determined by properly designing lengths of the plurality of line segments 41 between the output nodes N1-N6 and the input node NO. Notably, the transmission power divider is not limited to be the same as the structure illustrated in FIG. 4. The transmission power divider of the present invention may be realized by other kind of circuit structure.

Figure 5:
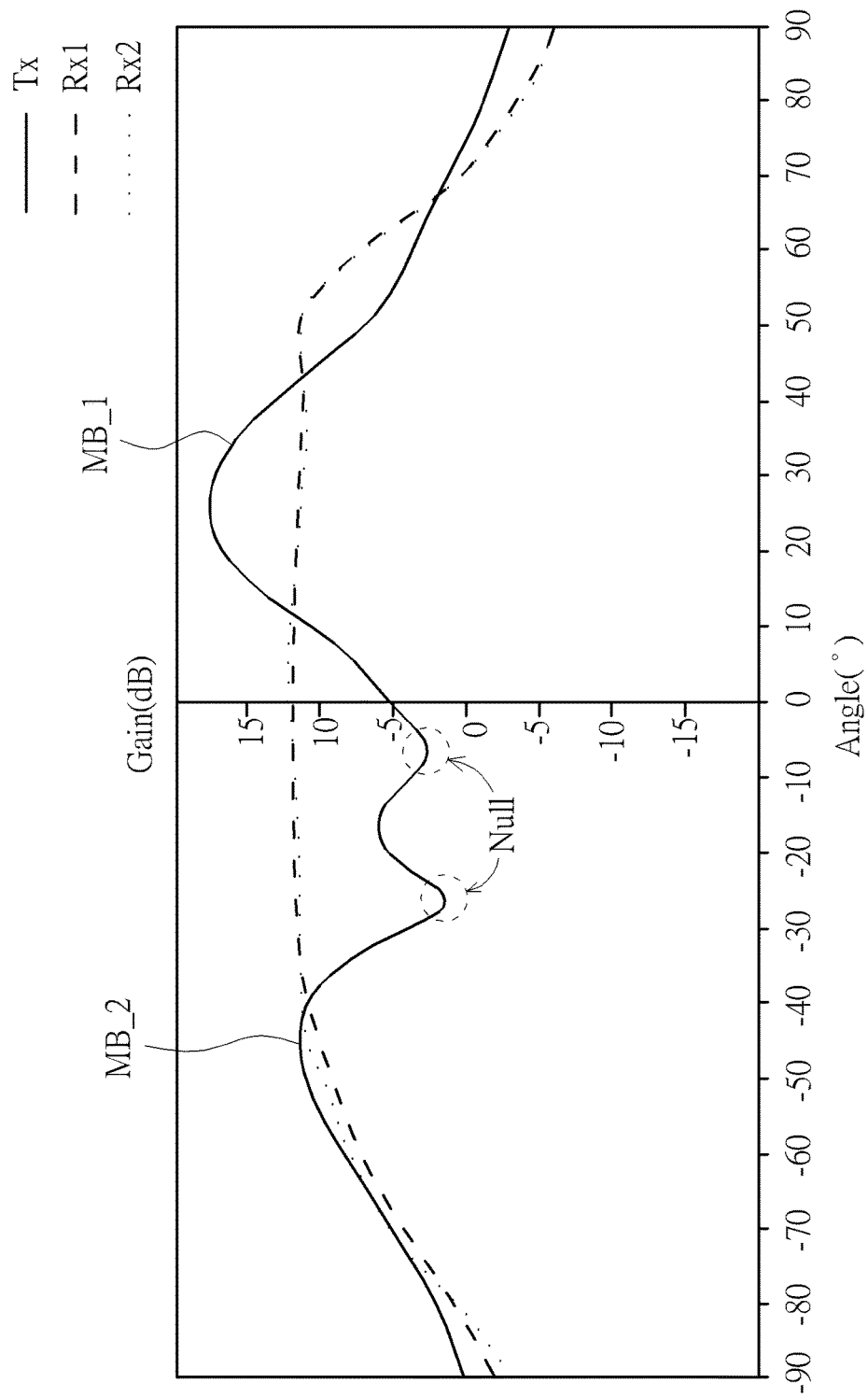
FIG. 5 is a schematic diagram of a transmitting radiation pattern and a receiving radiation pattern of the vehicular radar system of FIG. 1.

Referring to FIG. 5, which is a schematic diagram of a transmitting radiation pattern and a receiving radiation pattern of the vehicular radar system 10. In FIG. 5, a solid line represents transmitting radiation pattern formed by the transmitting sub-arrays T_1-T_6. A dashed line and a dotted line represent the receiving radiation patterns formed by the receiving sub-arrays R_1 and R_2. The transmitting sub-arrays T_1-T_6 are able to form a first main beam MB_1 and a second main beam MB_2 on the Azimuth plane. As FIG. 5 shows, a first beam direction, which the first main beam MB_1 is toward, is between 20 degrees and 30 degrees. A second beam direction, which the second main beam MB_2 is toward, is between −40 degrees and −50 degrees. A difference between the first beam direction and the second beam direction over the Azimuth plane is at least 60 degrees. In addition, by forming the phase difference between the transmitting sub-array T_4 and the transmitting sub-array T_6 to be between 120 degrees and 180 degrees, a null is formed between the first beam direction and the second beam direction. Therefore, the two main beams MB_1 and MB_2 are formed on the Azimuth Angle. In addition, since the reception distance $D_R$ is smaller than one-half of the wavelength of the wireless signal of the vehicular radar system 10, the receiving radiation patterns formed by the receiving sub-arrays R_1 and R_2 have a 3 dB beamwidth substantially 100 degrees, such that the vehicular radar system 10 have a wide angle scanning scope.

Figure 6:
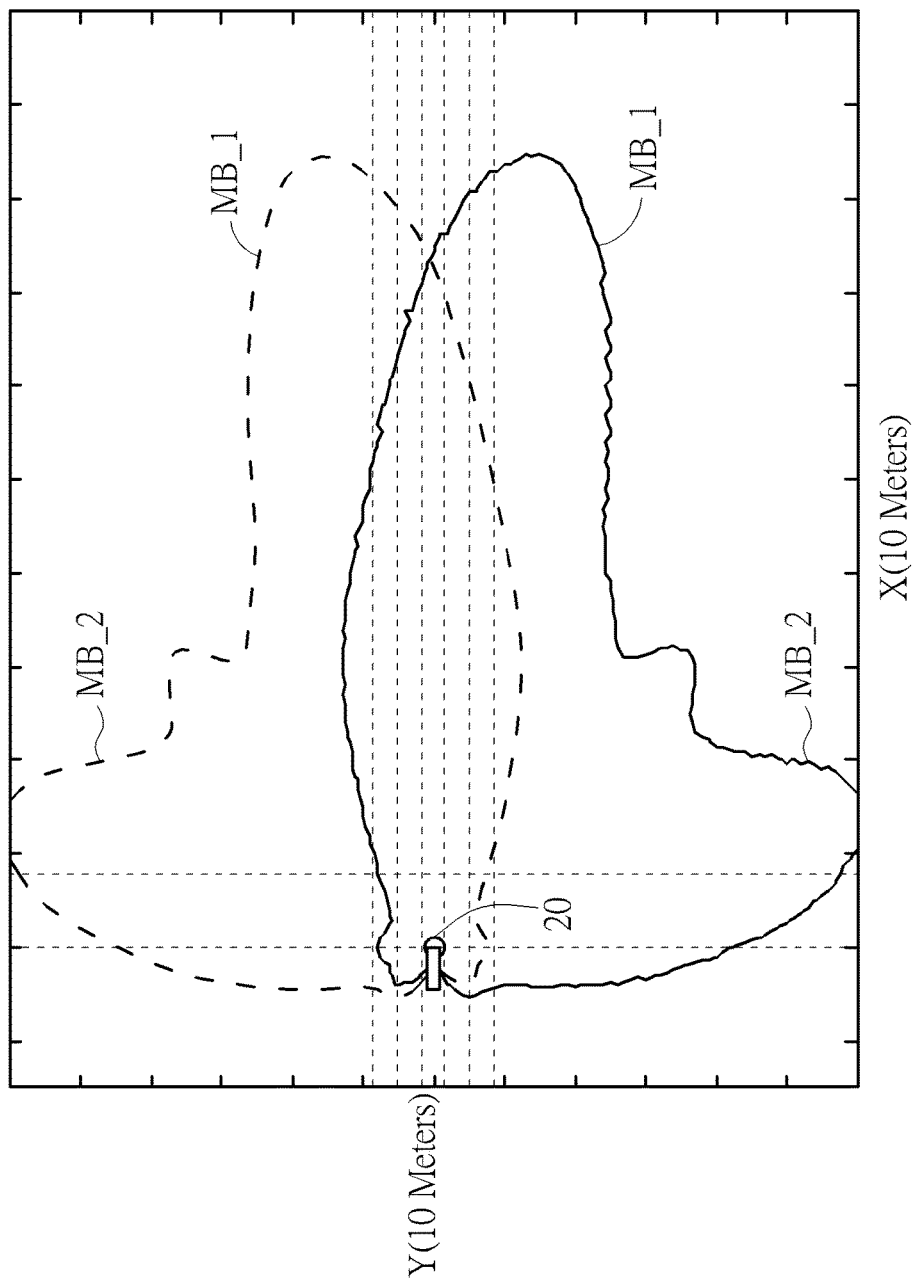
FIG. 6 is a schematic diagram of a signal-to-noise ratio (SNR) pattern of the vehicular radar system of FIG. 1.

Referring to FIG. 6, which is a schematic diagram of a signal-to-noise ratio (SNR) pattern formed by two vehicular radar systems 10 disposed at the left-rear corner RLC of the car 20 and the right-rear corner RRC. The SNR pattern of the vehicular radar systems 10 is illustrated on a plane spanned by an X axis and a Y axis (i.e., the Azimuth plane). A unit of the X axis and the Y axis represents 10 meters. In FIG. 6, a solid line represents the SNR pattern formed by the vehicular radar system 10 disposed at the left-rear corner RLC of the car 20, and a dashed line represents the SNR pattern formed by the vehicular radar system 10 disposed at the right-rear corner RRC of the car 20.

As can be seen from FIG. 6, the first main beam MB_1 is toward a rear of the car 20, and a sensing range which the vehicular radar system 10 may achieve is 70 meters behind the car 20, which may be applied in the LCA system or the DOW system. Note that, both the LCA system and the DOW system need to sense the traffic conditions behind the car 20, and the LCA system requires a longer sensing range than which of the DOW system. Hence, a gain corresponding to the first main beam MB_1 of the vehicular radar system 10 is adjustable to fit the requirements of the LCA system and the DOW system. For example, when the vehicular radar system 10 is applied in the LCA system, the gain corresponding to the first main beam MB_1 of the vehicular radar system 10 is adjusted to be higher, such that the sensing range thereof is longer. On the other hand, when the vehicular radar system 10 is applied in the DOW system, the gain corresponding to the first main beam MB_1 of the vehicular radar system 10 is adjusted to be lower, such that the sensing range thereof is shorter.

In another perspective, the second main beam MB_2 is toward aside (either a left side or a right side) of the car 20, and a sensing range which the vehicular radar system 10 may achieve is 40 meters from the side of the car 20, which may be applied in the ROTA system or the BSD system. Note that, both the ROTA system and the BSD system need to sense the traffic conditions by the sides of the car 20, and the ROTA system requires a longer sensing range than which of the BSD system. Hence, a gain corresponding to the second main beam MB_2 of the vehicular radar system 10 is adjustable to fit the requirements of the ROTA system and the BSD system. For example, when the vehicular radar system 10 is applied in the ROTA system, the gain corresponding to the second main beam MB_2 of the vehicular radar system 10 is adjusted to be higher, such that the sensing range thereof is longer. On the other hand, when the vehicular radar system 10 is applied in the BSD system, the gain corresponding to the second main beam MB_2 of the vehicular radar system 10 is adjusted to be lower, such that the sensing range thereof is shorter.

As can be seen, the vehicular radar systems 10 may be disposed at the left-rear corner RLC of the car 20 and the right-rear corner RRC, and each vehicular radar system 10 may form two main beams toward the rear and the side (either the right side or the left side) of the car 20. In comparison to the prior art, one single vehicular radar system 10 may satisfy the requirements of the LCA system, the DOW system, the ROTA system and the BSD system. Therefore, a production cost and an integration complexity of the vehicular warning system are reduced.

Notably, the embodiments stated in the above are utilized for illustrating the concept of the present invention. Those skilled in the art may make modifications and alterations accordingly, and not limited herein. For example, the RF processing module 100 is not limited to be the one-transmit-two-receive RF processing module. The RF processing module may be an M-transmit-N-receive RF processing module. As long as M is at least equal to 1 and N is at least equal to 2, requirements of the present invention are satisfied. In addition, in the vehicular radar system 10, it is not limited to form the phase difference (which is between 120 degrees and 180 degrees) between the transmitting sub-array T_4 and the transmitting sub-array T_6 to form the two main beams. In an embodiment, one may form a phase difference (which is between 120 degrees and 180 degrees) between the transmitting sub-array T_1 and the transmitting sub-array T_3 to form the two main beams, where the transmitting sub-array T_1 and the transmitting sub-array T_3 are disposed on the other side of the symmetry axis Sym. In an embodiment, one may form a phase difference (which is between 120 degrees and 180 degrees) between the transmitting sub-array T_1 and the transmitting sub-array T_3, and form a phase difference (which is between 120 degrees and 180 degrees) between the transmitting sub-array T_4 and the transmitting sub-array T_6 as well at the same time, so as to form the two main beams, which is also within the scope of the present invention.

In addition, the vehicular radar system 10 comprises six transmitting sub-arrays, which is not limited thereto. A number of transmitting sub-arrays comprised in the vehicular radar system may be larger or smaller than six. As long as the vehicular radar system comprises at least two transmitting sub-arrays, and a phase difference between the transmitting sub-array closest to the symmetry axis and the transmitting sub-array farthest away from the symmetry axis in the vehicular radar system is formed to be between 120 degrees and 180 degrees, two main beams are able to be formed and requirements of the present invention are satisfied. In other words, the vehicular radar system of the present invention may comprise the transmitting sub-arrays T_1-T_N (implying that the vehicular radar system comprises N transmitting sub-arrays), and the transmission power divider of the vehicular radar system may apply the amplitudes $A_1$-$A_N$ and the phases $\varphi_1$-$\varphi_N$ to the transmitting sub-arrays T_1-T_N. In such a situation, the vehicular radar system may form the two main beams.

Figure 7:
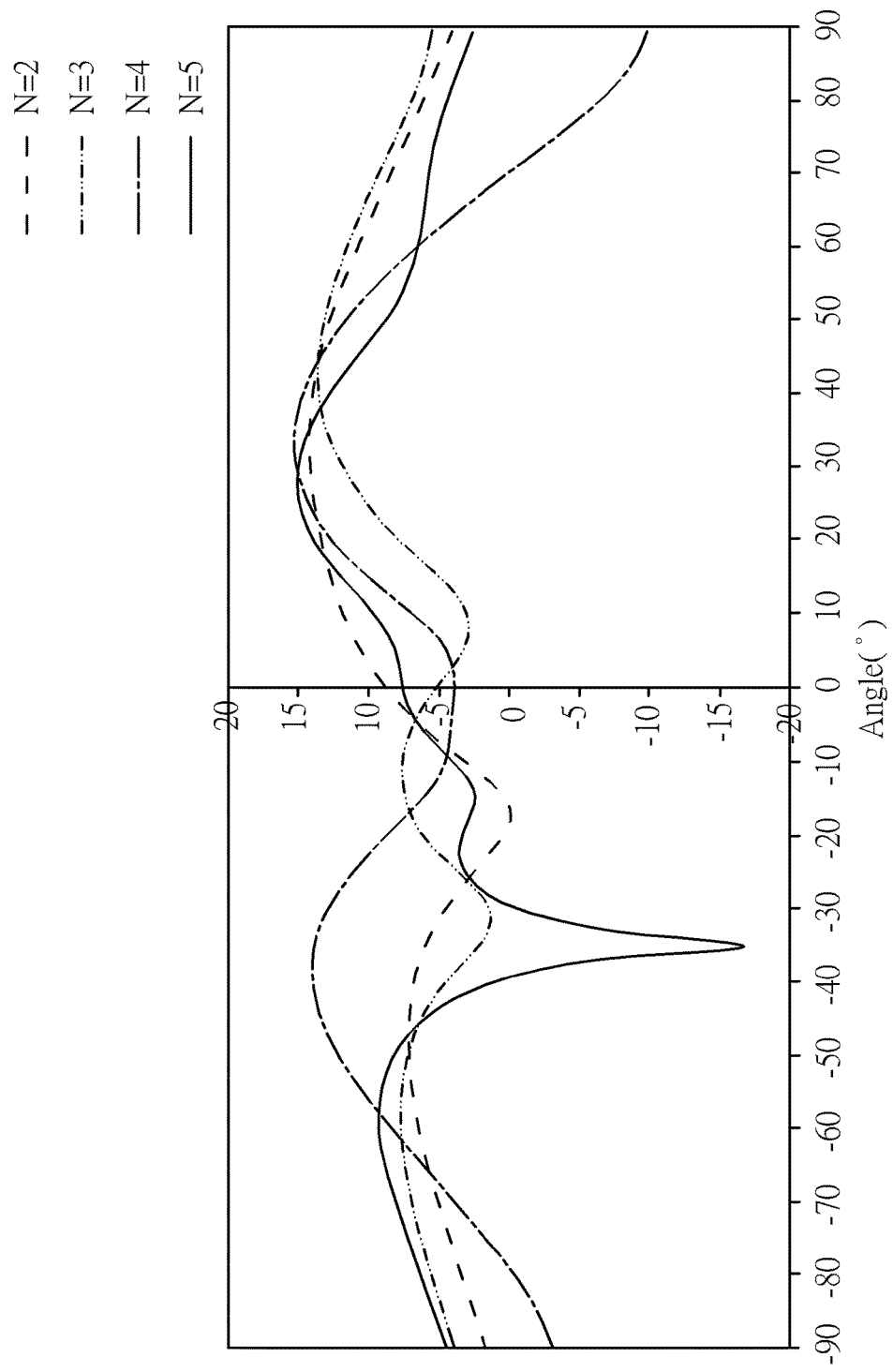
FIG. 7 is a schematic diagram of transmitting radiation patterns of vehicular radar systems according to embodiments of the present invention.

In detail, referring to FIG. 7, which is a schematic diagram of transmitting radiation patterns corresponding to vehicular radar systems comprising N transmitting sub-arrays according to embodiments of the present invention. As can be seen from FIG. 7, different vehicular radar systems, which comprise different numbers of transmitting sub-arrays, may form the two main beams, which means that the vehicular radar system may form the first main beam and the second main beam, where an angle difference between the first beam direction of the first main beam and the second beam direction of the second main beam on the Azimuth plane is 60-90 degrees. For example, when N=2 (representing that the vehicular radar system comprises the transmitting sub-arrays T_1, T_2), the symmetry axis lies between the transmitting sub-array T_1 and the transmitting sub-array T_2. The phase $\varphi_1$ may be 0 degrees, and the phase $\varphi_2$ may be 120 degrees. The normalized amplitudes $A_1$ and $A_2$ may have a relation of $0 \leq A1 \leq A2 \leq 1$. When N=3 (representing that the vehicular radar system comprises the transmitting sub-array T_1-T_3), the symmetry axis is lied on the transmitting sub-array T_2. In addition, the phase $\varphi_1$ may be 120 degrees, the phase $\varphi_2$ may be 0 degrees, and the phase $\varphi_3$ may be 180 degrees. The normalized amplitudes $A_1$-$A_3$ may have a relation of $0 \leq A1 \leq A3 \leq A2 \leq 1$. When N=4 (representing that the vehicular radar system comprises the transmitting sub-arrays T_1-T_4), the symmetry axis lies between the transmitting sub-array T_2 and the transmitting sub-array T_3. In addition the phase $\varphi_1$ may be 120 degrees, the phase $\varphi_2$ and the phase $\varphi_3$ may be 0 degrees, and the phase $\varphi_4$ may be 180 degrees. The normalized amplitudes $A_1$ and $A_4$ may be between 0 and 0.5, and the normalized amplitudes $A_2$ and $A_3$ may be between 0.5 and 1. When N=5 (representing that the vehicular radar system comprises the transmitting sub-arrays T_1-T_5), the symmetry axis lies on the transmitting sub-array T_3. In addition, the phase $\varphi_1$ may be 180 degrees, the phase $\varphi_2$ may be 60 degrees, the phase $\varphi_3$ and the phase $\varphi_4$ may be −30 degrees, and the phase $\varphi_5$ may be 150 degrees. The normalized amplitudes $A_1$ and $A_5$ may be between 0.2 and 0.5, the normalized amplitudes $A_2$ and $A_4$ may be between 0 and 0.2, and the normalized amplitudes $A_3$ may be between 0.5 and 1. In other words, when a phase difference between the first sub-array closest to the symmetry axis and the second transmitting sub-array farthest away from the symmetry axis in the vehicular radar system is formed to be between 120 degrees and 180 degrees, the vehicular radar system forms the two main beams. Preferably, the first transmitting sub-array and the second transmitting sub-array are disposed on the same side of the symmetry axis.

In summary, the vehicular radar system of the present invention forms a phase difference between the first transmitting sub-array closest to the symmetry axis and the second transmitting sub-array farthest away from the symmetry axis in the vehicular radar system to be 120-180 degrees and the two main beams are formed. In addition, according to the present invention, the amplitude(s) applied to the transmitting sub-array closest to the symmetry axis are maximum, the amplitude (s) applied to the transmitting sub-array farthest away from the symmetry axis are medium, and the amplitude(s) applied to the rest of the transmitting sub-array(s) are minimum, such that the effect of the two main beams becomes more significant. Compared to the prior art, the vehicular radar system of the present invention may meet the requirements of the LCA system, the DOW system, the RCTA system and the BSD system at the same time, such that the production cost and the integration complexity of the vehicular warning system are reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicular radar system, comprising:
   a plurality of transmitting sub-arrays, wherein the plurality of transmitting sub-arrays are symmetric with respect to a symmetry axis, and the plurality of transmitting sub-arrays are parallel to the symmetry axis; and
   a transmission power divider, coupled to the plurality of transmitting sub-arrays, configured to apply a plurality of phases and a plurality of amplitudes to the plurality of transmitting sub-arrays;
   wherein a phase difference, between a first phase applied to a first transmitting sub-array closest to the symmetry axis and a second phase applied to a second transmitting sub-array farthest away from the symmetry axis, is between 120 degrees and 180 degrees; and
   wherein the first transmitting sub-array and the second transmitting sub-array are among the plurality of transmitting sub-arrays;
   wherein the vehicular radar system forms a first main beam and a second main beam, the first main beam and the second main beam are toward a first beam direction and a second beam direction, respectively, and a difference between the first beam direction and the second beam direction is at least 60 degrees on an Azimuth plane.

2. The vehicular radar system of claim 1, wherein the plurality of transmitting sub-arrays comprises a plurality of connecting lines, the plurality of connecting lines is parallel to the symmetry axis.

3. The vehicular radar system of claim 1, wherein a first amplitude applied by the transmission power divider to the first transmitting sub-array is greater than a second amplitude applied to the second transmitting sub-array, wherein the first amplitude and the second amplitude are among the plurality of amplitudes.

4. The vehicular radar system of claim 3, further comprising a third transmitting sub-array, wherein a third amplitude applied by the transmission power divider to the third transmitting sub-array is smaller than the second amplitude, wherein the third transmitting sub-array is among the plurality of transmitting sub-arrays and the third amplitude is among the plurality of amplitudes.

5. The vehicular radar system of claim 1, wherein, among the plurality of transmitting sub-arrays, a transmitting sub-array is separated from another transmitting sub-array by a transmission distance, and the transmission distance is one-half of a wavelength of a wireless signal of the vehicular radar system.

6. The vehicular radar system of claim 1, further comprising:
   a plurality of receiving sub-arrays;
   wherein, among the plurality of transmitting sub-arrays, a receiving sub-array is separated from another receiving sub-array by a reception distance, and the reception distance is one-half of a wavelength of a wireless signal of the vehicular radar system.

7. The vehicular radar system of claim 1, wherein the vehicular radar system forms a null between the first beam direction and the second beam direction.

8. The vehicular radar system of claim 1, wherein the transmission power divider comprises:
  at least one transmission unit; and
  a plurality of line segments, configured to connect the at least one transmission unit and the plurality of transmitting sub-arrays;
  wherein the plurality of amplitudes are determined by the at least one transmission unit, and the plurality of phases are determined by the plurality of line segments.

9. The vehicular radar system of claim 1, further comprising a radio frequency (RF) processing module, coupled to the transmission power divider, wherein the RF processing module has an M-transmit-N-receive structure, M is at least 1 and N is at least 2.

10. The vehicular radar system of claim 1, wherein the first transmitting sub-array and the second transmitting sub-array are disposed on a same side of the symmetry axis.

11. A vehicular radar system, comprising:
  a plurality of transmitting sub-arrays, wherein the plurality of transmitting sub-arrays are symmetric with respect to a symmetry axis, and the plurality of transmitting sub-arrays are parallel to the symmetry axis; and
  a transmission power divider, coupled to the plurality of transmitting sub-arrays, configured to apply a plurality of phases and a plurality of amplitudes to the plurality of transmitting sub-arrays;
  wherein a phase difference, between a first transmitting sub-array closest to the symmetry axis and a second transmitting sub-array farthest away from the symmetry axis, is between 120 degrees and 180 degrees; and
  wherein the first transmitting sub-array and the second transmitting sub-array are among the plurality of transmitting sub-arrays;
  wherein a first amplitude applied by the transmission power divider to the first transmitting sub-array is greater than a second amplitude applied to the second transmitting sub-array, wherein the first amplitude and the second amplitude are among the plurality of amplitudes.

12. The vehicular radar system of claim 11, wherein the plurality of transmitting sub-arrays comprises a plurality of connecting lines, the plurality of connecting lines is parallel to the symmetry axis.

13. The vehicular radar system of claim 11, further comprising a third transmitting sub-array, wherein a third amplitude applied by the transmission power divider to the third transmitting sub-array is smaller than the second amplitude, wherein the third transmitting sub-array is among the plurality of transmitting sub-arrays and the third amplitude is among the plurality of amplitudes.

14. The vehicular radar system of claim 11, wherein, among the plurality of transmitting sub-arrays, a transmitting sub-array is separated from another transmitting sub-array by a transmission distance, and the transmission distance is one-half of a wavelength of a wireless signal of the vehicular radar system.

15. The vehicular radar system of claim 11, further comprising:
  a plurality of receiving sub-arrays;
  wherein, among the plurality of transmitting sub-arrays, a receiving sub-array is separated from another receiving sub-array by a reception distance, and the reception distance is one-half of a wavelength of a wireless signal of the vehicular radar system.

16. The vehicular radar system of claim 11, wherein the transmission power divider comprises:
  at least one transmission unit; and
  a plurality of line segments, configured to connect the at least one transmission unit and the plurality of transmitting sub-arrays;
  wherein the plurality of amplitudes are determined by the at least one transmission unit, and the plurality of phases are determined by the plurality of line segments.

17. The vehicular radar system of claim 11, further comprising a radio frequency (RF) processing module, coupled to the transmission power divider, wherein the RF processing module has an M-transmit-N-receive structure, M is at least 1 and N is at least 2.

18. The vehicular radar system of claim 11, wherein the first transmitting sub-array and the second transmitting sub-array are disposed on a same side of the symmetry axis.

19. A vehicular radar system, comprising:
  a plurality of transmitting sub-arrays, wherein the plurality of transmitting sub-arrays are symmetric with respect to a symmetry axis, and the plurality of transmitting sub-arrays are parallel to the symmetry axis; and
  a transmission power divider, coupled to the plurality of transmitting sub-arrays, configured to apply a plurality of phases and a plurality of amplitudes to the plurality of transmitting sub-arrays;
  wherein a phase difference, between a first transmitting sub-array closest to the symmetry axis and a second transmitting sub-array farthest away from the symmetry axis, is between 120 degrees and 180 degrees; and
  wherein the first transmitting sub-array and the second transmitting sub-array are among the plurality of transmitting sub-arrays;
  wherein the transmission power divider comprises:
    at least one transmission unit; and
    a plurality of line segments, configured to connect the at least one transmission unit and the plurality of transmitting sub-arrays;
    wherein the plurality of amplitudes are determined by the at least one transmission unit, and the plurality of phases are determined by the plurality of line segments.

* * * * *